United States Patent
Yamada et al.

(10) Patent No.: US 10,782,207 B2
(45) Date of Patent: Sep. 22, 2020

(54) METHOD FOR INSPECTING BALL SCREW MECHANISM, APPARATUS FOR INSPECTING BALL SCREW MECHANISM, AND METHOD FOR INSPECTING STEERING SYSTEM

(71) Applicant: JTEKT CORPORATION, Osaka-shi, Osaka (JP)

(72) Inventors: Yoshimasa Yamada, Kitakatsuragi-gun (JP); Ryousuke Imai, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 291 days.

(21) Appl. No.: 15/943,783

(22) Filed: Apr. 3, 2018

(65) Prior Publication Data

US 2018/0292294 A1 Oct. 11, 2018

(30) Foreign Application Priority Data

Apr. 11, 2017 (JP) .................................. 2017-078488

(51) Int. Cl.

| G01M 13/02 | (2019.01) |
|---|---|
| B23Q 1/40 | (2006.01) |
| F16H 25/22 | (2006.01) |
| G01M 13/04 | (2019.01) |
| G01M 17/06 | (2006.01) |
| G01M 13/021 | (2019.01) |
| B62D 5/04 | (2006.01) |
| B62D 3/08 | (2006.01) |

(52) U.S. Cl.
CPC ............. *G01M 13/021* (2013.01); *B23Q 1/40* (2013.01); *B62D 5/0427* (2013.01); *B62D 5/0448* (2013.01); *G01M 13/04* (2013.01); *G01M 17/06* (2013.01); *B62D 3/08* (2013.01); *F16H 25/2204* (2013.01)

(58) Field of Classification Search
None
See application file for complete search history.

(56) References Cited

U.S. PATENT DOCUMENTS

2017/0350483 A1* 12/2017 Asakura .............. F16H 25/2233

FOREIGN PATENT DOCUMENTS

| JP | 11-271007 | * | 10/1999 | ............ G01B 5/16 |
|---|---|---|---|---|
| JP | 2002-206614 A | | 7/2002 | |
| JP | 2004-084683 | * | 3/2004 | ............ F16H 25/20 |
| JP | 2005-221023 | * | 8/2005 | ............ F16H 25/22 |

(Continued)

*Primary Examiner* — Daniel S Larkin
(74) *Attorney, Agent, or Firm* — Oliff PLC (57) ABSTRACT

A ball screw mechanism includes a ball nut member that threadedly engages with a rack shaft via a plurality of balls, and a rolling bearing including an outer ring retained by a housing, an inner ring retained by the ball nut member, and a plurality of rolling elements. The ball screw mechanism moves the rack shaft in an axial direction relative to the housing through rotation of the ball nut member. A method for inspecting the ball screw mechanism includes fixing the outer ring to a fixing jig, pressing the rack shaft in the axial direction while restricting its rotation to rotate the ball nut member together with the inner ring relative to the outer ring, measuring an amount of a run-out of the rack shaft along with the rotation of the ball nut member, and determining whether the amount of the run-out satisfies a predetermined condition.

5 Claims, 8 Drawing Sheets

(56) References Cited

FOREIGN PATENT DOCUMENTS

| JP | 2007-064863 A | | 3/2007 | |
|---|---|---|---|---|
| JP | 2011-122906 | * | 6/2011 | ............... G01L 3/14 |
| JP | 2016-109483 | * | 6/2016 | ............ G01M 13/02 |
| KR | 10-2012-0134007 | * | 12/2016 | ............... G01B 5/20 |

* cited by examiner

METHOD FOR INSPECTING BALL SCREW MECHANISM, APPARATUS FOR INSPECTING BALL SCREW MECHANISM, AND METHOD FOR INSPECTING STEERING SYSTEM

INCORPORATION BY REFERENCE

The disclosure of Japanese Patent Application No. 2017-078488 filed on Apr. 11, 2017 including the specification, drawings and abstract, is incorporated herein by reference in its entirety.

BACKGROUND OF THE INVENTION

1. Field of the Invention

The present invention relates to a method for inspecting a ball screw mechanism, an apparatus for inspecting a ball screw mechanism, a method for manufacturing a ball screw mechanism, and a method for inspecting a steering system.

2. Description of the Related Art

Hitherto, ball screw mechanisms each including a shaft, a ball nut member, and a plurality of balls are used in various apparatuses such as a steering system for a vehicle. The shaft has a helical ball track formed on its outer peripheral surface. The ball nut member has a helical ball track formed on its inner peripheral surface. The balls roll along the ball tracks of the shaft and the ball nut member. The ball nut member has a ball recirculation path for recirculating the balls after the balls roll along the ball tracks. The balls circulate along the ball tracks and the ball recirculation path along with relative rotation of the shaft and the ball nut member.

Japanese Patent Application Publication No. 2007-64863 (JP 2007-64863 A) describes an inspection method that involves detecting noise or vibration generated when a ball nut holder that holds a ball nut member is rotated by a motor, and determining that the ball nut member subjected to inspection is defective when the intensity of noise or vibration is higher than a set threshold. In this inspection method, if a stepped portion is formed in the ball recirculation path due to, for example, failure in machining of the ball nut member, a defective product can be found by detecting noise or vibration generated at the stepped portion.

Japanese Patent Application Publication No. 2002-206614 (JP 2002-206614 A) describes an inspection method that involves detecting a bend or eccentricity of a shaft (ball screw) by fitting a run-out investigation bush machined in advance with high accuracy to the shaft, and measuring a radial run-out of the run-out investigation bush when the shaft is rotated.

The noise or vibration of the ball screw mechanism may be generated depending not only on the machining accuracy of the ball nut member or the shaft, but also on the attachment accuracy of a bearing that supports the ball nut member. When the ball screw mechanism is used in a steering assist apparatus of the steering system for the vehicle and when the attachment accuracy of the bearing that supports the ball nut member is low, a steering reactive force generated when a steering wheel is steered may increase or decrease periodically in response to a change in a steering angle.

SUMMARY OF THE INVENTION

It is one object of the present invention to provide a method for inspecting a ball screw mechanism, an apparatus for inspecting a ball screw mechanism, a method for manufacturing a ball screw mechanism, and a method for inspecting a steering system, in which failure in attachment can be detected with high accuracy when the attachment accuracy of a bearing that supports a ball nut member is low.

One aspect of the present invention relates to a method for inspecting a ball screw mechanism including a shaft having a helical ball track formed on its outer peripheral surface, a cylindrical ball nut member that threadedly engages with the ball track via a plurality of balls, a housing that houses the ball nut member, and a rolling bearing including an outer ring retained by the housing, an inner ring retained by the ball nut member, and a plurality of rolling elements arranged between the outer ring and the inner ring. The ball screw mechanism is configured to move the shaft in an axial direction relative to the housing through rotation of the ball nut member.

The method includes:

fixing the outer ring to a jig, and pressing the shaft in the axial direction while restricting its rotation to rotate the ball nut member together with the inner ring relative to the outer ring;

measuring an amount of a run-out of the shaft along with the rotation of the ball nut member; and determining whether the amount of the run-out satisfies a predetermined condition.

Another aspect of the present invention relates to an apparatus for inspecting a ball screw mechanism including a shaft having a helical ball track formed on its outer peripheral surface, a cylindrical ball nut member that threadedly engages with the ball track via a plurality of balls, a housing that houses the ball nut member, and a rolling bearing including an outer ring retained by the housing, an inner ring retained by the ball nut member, and a plurality of rolling elements arranged between the outer ring and the inner ring. The ball screw mechanism is configured to move the shaft in an axial direction relative to the housing through rotation of the ball nut member.

The apparatus includes:

a jig configured to fix the outer ring in a non-rotatable and axially immovable manner;

a pressing device configured to press the shaft in the axial direction while restricting its rotation to rotate the ball nut member together with the inner ring relative to the outer ring;

a measurement device configured to measure an amount of a run-out of the shaft along with the rotation of the ball nut member; and a determination device configured to determine whether the amount of the run-out measured by the measurement device satisfies a predetermined condition.

Still another aspect of the present invention relates to a method for manufacturing a ball screw mechanism including a shaft having a helical ball track formed on its outer peripheral surface, a cylindrical ball nut member that threadedly engages with the ball track via a plurality of balls, a housing that houses the ball nut member, and a rolling bearing including an outer ring retained by the housing, an inner ring retained by the ball nut member, and a plurality of rolling elements arranged between the outer ring and the inner ring. The inner ring is held between a stepped surface formed between a large-diameter portion and a small-diameter portion of the ball nut member and a ring nut that threadedly engages with an external thread provided on the small-diameter portion. The ball screw mechanism is configured to move the shaft in an axial direction relative to the housing through rotation of the ball nut member.

The method includes:

performing inspection by fixing the outer ring to a jig, pressing the shaft in the axial direction while restricting its rotation to rotate the ball nut member together with the inner ring relative to the outer ring, measuring an amount of a run-out of the shaft along with the rotation of the ball nut member, and determining whether the amount of the run-out satisfies a predetermined normality determination condition; and performing, when the normality determination condition is not satisfied in the inspection, reworking by loosening the ring nut, and then retightening the ring nut onto the external thread.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
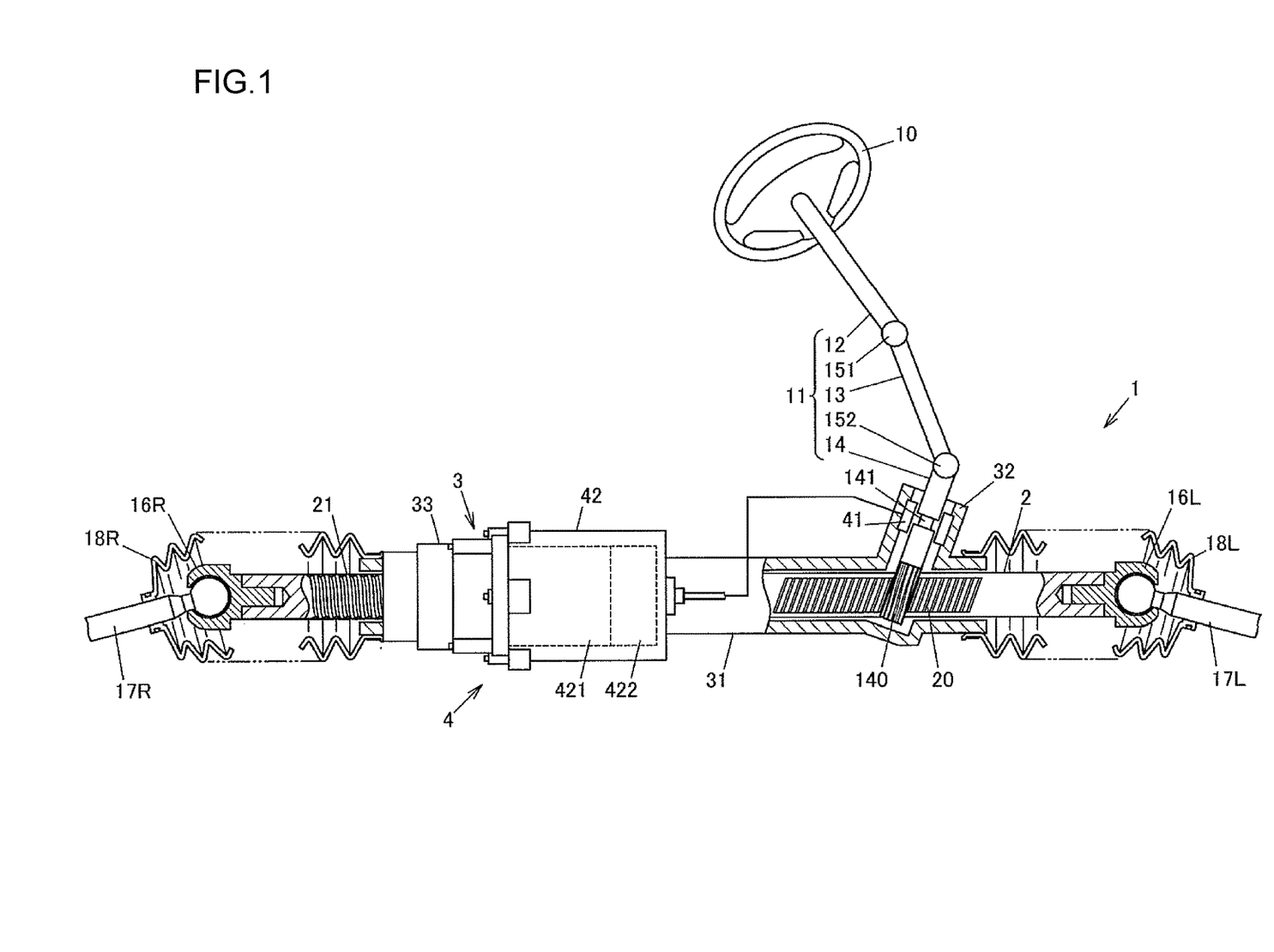
FIG. 1 is a structural view schematically illustrating an example of the structure of a steering system constructed by using a ball screw mechanism according to the present invention.
Figure 2:
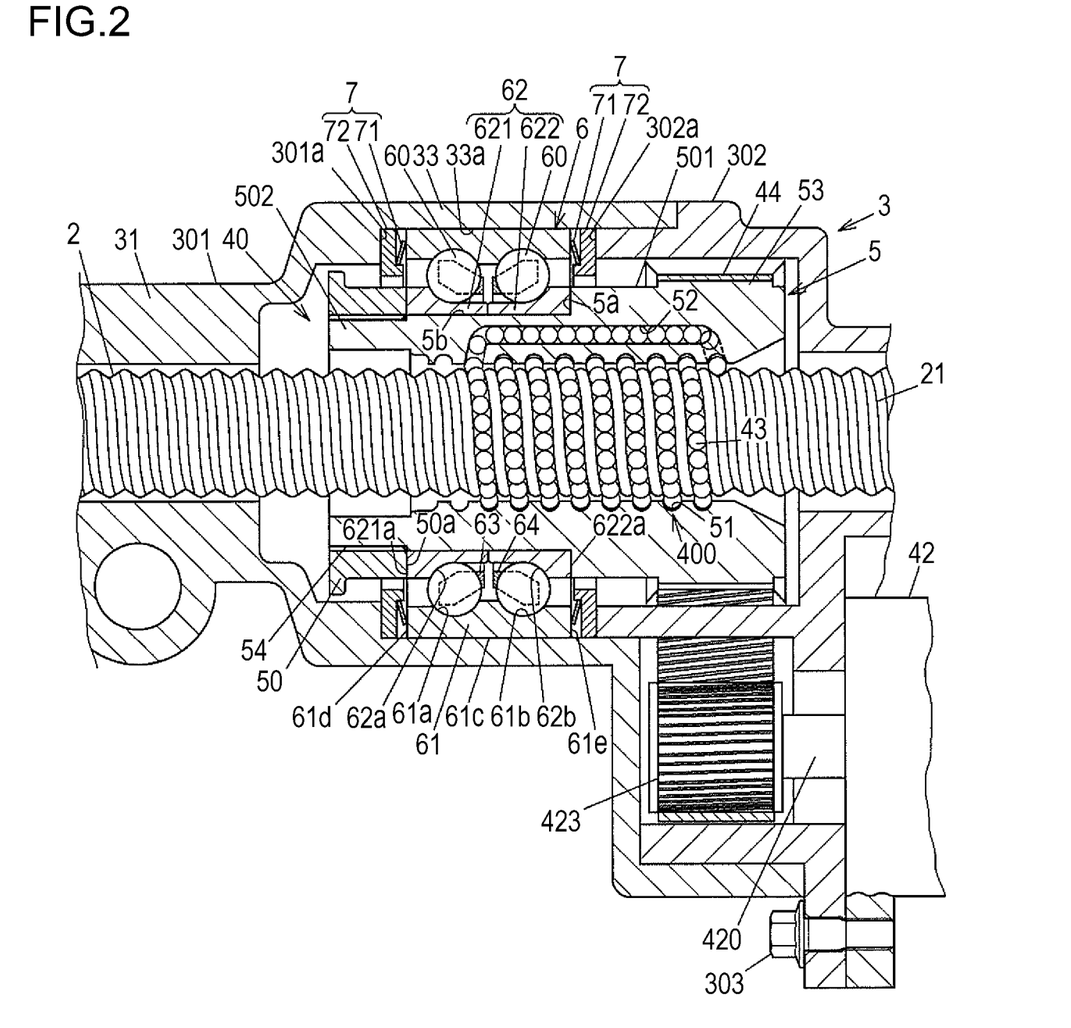
FIG. 2 is a sectional view illustrating the structure of a main part of a steering assist apparatus of the steering system.

An embodiment of the present invention is described with reference to FIG. 1 to FIG. 8. FIG. 1 is a structural view schematically illustrating an example of the structure of a steering system constructed by using a ball screw mechanism according to the present invention. FIG. 2 is a sectional view illustrating the structure of a main part of a steering assist apparatus of the steering system.

A steering system 1 is mounted on a vehicle, and turns right and left front wheels that are steered wheels in response to a driver's steering operation. FIG. 1 illustrates a state in which the steering system is viewed from a front side of the vehicle. The left side of FIG. 1 is a right side of the vehicle, and the right side of FIG. 1 is a left side of the vehicle. The letter "R" in the reference symbols in FIG. 1 represents the right side of the vehicle, and the letter "L" represents the left side of the vehicle.

The steering system 1 includes a steering shaft 11, a rack shaft 2, a metal housing 3, and a steering assist apparatus 4. A steering wheel 10 to be steered by the driver is coupled to the steering shaft 11. The rack shaft 2 moves in a vehicle width direction through the steering operation for the steering wheel 10. The housing 3 houses the rack shaft 2. The steering assist apparatus 4 applies a steering assist force for assisting the steering operation for the steering wheel 10 to the rack shaft 2. The housing 3 houses the steering assist apparatus 4 and a part of the rack shaft 2. The steering system 1 turns the right and left front wheels that are the steered wheels through movement of the rack shaft 2 in the vehicle width direction.

The steering shaft 11 includes a column shaft 12, an intermediate shaft 13, and a pinion shaft 14. The steering wheel 10 is fixed to one end of the column shaft 12. The intermediate shaft 13 is coupled to the column shaft 12 via a universal joint 151. The pinion shaft 14 is coupled to the intermediate shaft 13 via a universal joint 152. For example, the universal joints 151 and 152 are Cardan joints.

The pinion shaft 14 has pinion teeth 140 formed at its distal end. The rack shaft 2 has rack teeth 20 and a helical ball track 21. The rack teeth 20 mesh with the pinion teeth 140. A part of the pinion shaft 14 is formed as a flexible torsion bar 141 to be twisted by a steering torque applied to the steering wheel 10. A torsion angle of the torsion bar 141 is detected by a torque sensor 41. The torque sensor 41 detects the steering torque based on the degree of the torsion angle of the torsion bar 141.

As illustrated in FIG. 1, right and left tie rods 17R and 17L are respectively coupled to both ends of the rack shaft 2 via ball joints 16R and 16L. Extensible and contractible bellows 18R and 18L are respectively provided between both ends of the housing 3 and the tie rods 17R and 17L. When the rack shaft 2 advances or retreats in the vehicle width direction (lateral direction), the right and left front wheels are respectively turned by the right and left tie rods 17R and 17L.

The steering assist apparatus 4 includes the torque sensor 41, an electric motor 42, a cylindrical ball nut member 5, a rolling bearing 6, a pair of right and left elastic support mechanisms 7, and a synthetic rubber belt 44. The ball nut member 5 threadedly engages with the ball track 21 formed on the outer peripheral surface of the rack shaft 2 via a plurality of balls 43. The rolling bearing 6 supports the ball nut member 5 so that the ball nut member 5 is rotatable relative to the housing 3. The elastic support mechanisms 7 elastically support the rolling bearing 6 in an axial direction. The belt 44 transmits a rotational force of the electric motor 42 to the ball nut member 5. The rack shaft 2, the ball nut member 5, the housing 3, and the rolling bearing 6 constitute a ball screw mechanism 40. The ball screw mechanism 40 moves the rack shaft 2 in the axial direction relative to the housing 3 through rotation of the ball nut member 5 relative to the housing 3.

As illustrated in FIG. 1, the electric motor 42 includes a drive unit 421 and a control unit 422. The drive unit 421 includes a stator and a rotor. The control unit 422 supplies a motor current to the stator of the drive unit 421. The electric motor 42 rotates the ball nut member 5 relative to the rack shaft 2. The control unit 422 supplies the motor current to the drive unit 421 in accordance with the steering torque detected by the torque sensor 41 and a vehicle speed. The drive unit 421 generates a torque by the motor current supplied from the control unit 422, thereby rotating the ball nut member 5 relative to the housing 3 via the belt 44.

The housing 3 includes a tubular rack shaft housing portion 31 that houses the rack shaft 2, a pinion shaft housing portion 32 that houses the pinion shaft 14, and a ball nut member housing portion 33 that houses the ball nut member 5. The pinion shaft 14 is supported on the pinion shaft housing portion 32 by a pair of bearings (not illustrated).

As illustrated in FIG. 2, the housing 3 is formed of a combination of a first member 301 and a second member 302. The ball nut member housing portion 33 is formed of a part of the first member 301 and a part of the second member 302. The rack shaft housing portion 31 located on the right side of the vehicle (left side in FIG. 2) with respect to the ball nut member housing portion 33 is formed of the first member 301. The rack shaft housing portion 31 located on the left side of the vehicle (right side in FIG. 2) with respect to the ball nut member housing portion 33 is formed of the second member 302. The electric motor 42 is fixed to the second member 302 with bolts 303.

A helical ball track 51 that faces the ball track 21 of the rack shaft 2 is formed on the inner peripheral surface of the ball nut member 5. The balls 43 roll along a ball rolling path 400 formed by the ball track 21 of the rack shaft 2 and the ball track 51 of the ball nut member 5. The ball nut member 5 has a ball recirculation path 52 that is open at two positions in the ball rolling path 400. The balls 43 circulate along the ball rolling path 400 and the ball recirculation path 52 through the rotation of the ball nut member 5. A longitudinal direction of the rack shaft housing portion 31 along a central axis of the rack shaft 2 is hereinafter referred to as an axial direction.

The ball nut member 5 has a driven pulley portion 53 around which the belt 44 is looped. The belt 44 is looped over a driving pulley 423 and the driven pulley portion 53. The driving pulley 423 rotates together with a shaft 420 of the electric motor 42. Thus, the belt 44 transmits the rotational force of the electric motor 42 to the ball nut member 5. The driven pulley portion 53 has a diameter larger than that of the driving pulley 423. The rotational force of the electric motor 42 is transmitted to the driven pulley portion 53 while the speed is reduced by the belt 44.

The rolling bearing 6 is a double-row ball bearing including a plurality of rolling elements 60 arranged in two rows. The rolling bearing 6 includes an outer ring 61, an inner ring 62, and first and second cages 63 and 64. The outer ring 61 is retained by the ball nut member housing portion 33 of the housing 3. The inner ring 62 is retained by the ball nut member 5. The first and second cages 63 and 64 are arranged between the outer ring 61 and the inner ring 62. The outer ring 61 has a first outer ring raceway surface 61*a* and a second outer ring raceway surface 61*b*. The rolling elements 60 in the first row roll along the first outer ring raceway surface 61*a*. The rolling elements 60 in the second row roll along the second outer ring raceway surface 61*b*. The rolling elements 60 are balls. The rolling elements 60 in the first row are retained by the first cage 63 at regular intervals, and the rolling elements 60 in the second row are retained by the second cage 64 at regular intervals.

The inner ring 62 is formed of a first inner ring member 621 and a second inner ring member 622. The first inner ring member 621 has a first inner ring raceway surface 62*a* along which the rolling elements 60 in the first row roll. The second inner ring member 622 has a second inner ring raceway surface 62*b* along which the rolling elements 60 in the second row roll. The rolling elements 60 in the first row are arranged between the first outer ring raceway surface 61*a* and the first inner ring raceway surface 62*a*. The rolling elements 60 in the second row are arranged between the second outer ring raceway surface 61*b* and the second inner ring raceway surface 62*b*.

The ball nut member 5 integrally has a large-diameter portion 501 and a small-diameter portion 502 that have different outside diameters. The driven pulley portion 53 is formed at one end of the large-diameter portion 501. A stepped surface 5*a* is formed between the large-diameter portion 501 and the small-diameter portion 502. An external thread 54 is formed on the outer peripheral surface at one end of the small-diameter portion 502. A ring nut 50 is threadedly attached to the external thread 54. For example, the ring nut 50 is crimped onto the ball nut member 5 to prevent loosening.

The inner ring 62 is held between the stepped surface 5*a* and the ring nut 50. A face 621*a* of the first inner ring member 621 that is opposite to the second inner ring member 622 abuts against an end face 50*a* of the ring nut 50. A face 622*a* of the second inner ring member 622 that is opposite to the first inner ring member 621 abuts against the stepped surface 5*a* of the ball nut member 5. Thus, the ring nut 50 fixes the inner ring 62 by tightening the inner ring 62 in the axial direction between the ring nut 50 and the stepped surface 5*a* of the ball nut member 5. The bore diameters of the first inner ring member 621 and the second inner ring member 622 are set slightly larger than the outside diameter of an outer peripheral surface 5*b* of the ball nut member 5 that faces an inner peripheral surface 621*b* of the first inner ring member 621 and an inner peripheral surface 622*b* of the second inner ring member 622.

The outer ring 61 is arranged between a stepped surface 301*a* formed on the first member 301 of the housing 3 and an axial end face 302*a* of the second member 302. An inner peripheral surface 33*a* of the ball nut member housing portion 33 between the stepped surface 301*a* and the axial end face 302*a* faces an outer peripheral surface 61*c* of the outer ring 61 in a radial direction. The outside diameter of the outer ring 61 is slightly smaller than the bore diameter of the inner peripheral surface 33*a* of the ball nut member housing portion 33. Therefore, the outer ring 61 is movable in the axial direction relative to the housing 3 such that the outer peripheral surface 61*c* slides against the inner peripheral surface 33*a* of the ball nut member housing portion 33.

The elastic support mechanisms 7 are respectively arranged between a first face 61*d* of the outer ring 61 and the stepped surface 301*a* of the first member 301 and between a second face 61*e* of the outer ring 61 and the axial end face 302*a* of the second member 302. The elastic support mechanism 7 is formed of a coned disc spring 71 that is an elastic body, and a retaining member 72 that retains the coned disc spring 71 and has an L-shape in cross section. The outer ring 61 is movable in the axial direction relative to the housing 3 within a range in which the coned disc spring 71 is elastically deformed. The coned disc spring 71 is deformed at an initial steering stage at which the steering wheel 10 is steered in a rightward or leftward direction from a neutral position. That is, when an axial movement force is applied to the rack shaft 2 through rotation of the pinion shaft 14 of the steering shaft 11 at the initial steering stage, the rack shaft 2 moves in the axial direction through the elastic deformation of the coned disc spring 71 before the steering assist apparatus 4 generates the steering assist force. Thus, an excellent steering feel can be attained without hindering the axial movement of the rack shaft 2 by the ball nut member 5 at the initial steering stage.

When the inner ring 62 is tightened by the ring nut 50, the first inner ring member 621 may be eccentric from the ball nut member 5 unless a frictional force applied between the end face 50a of the ring nut 50 and the face 621a of the first inner ring member 621 is uniform in a circumferential direction at a final stage of tightening.

Figure 3:
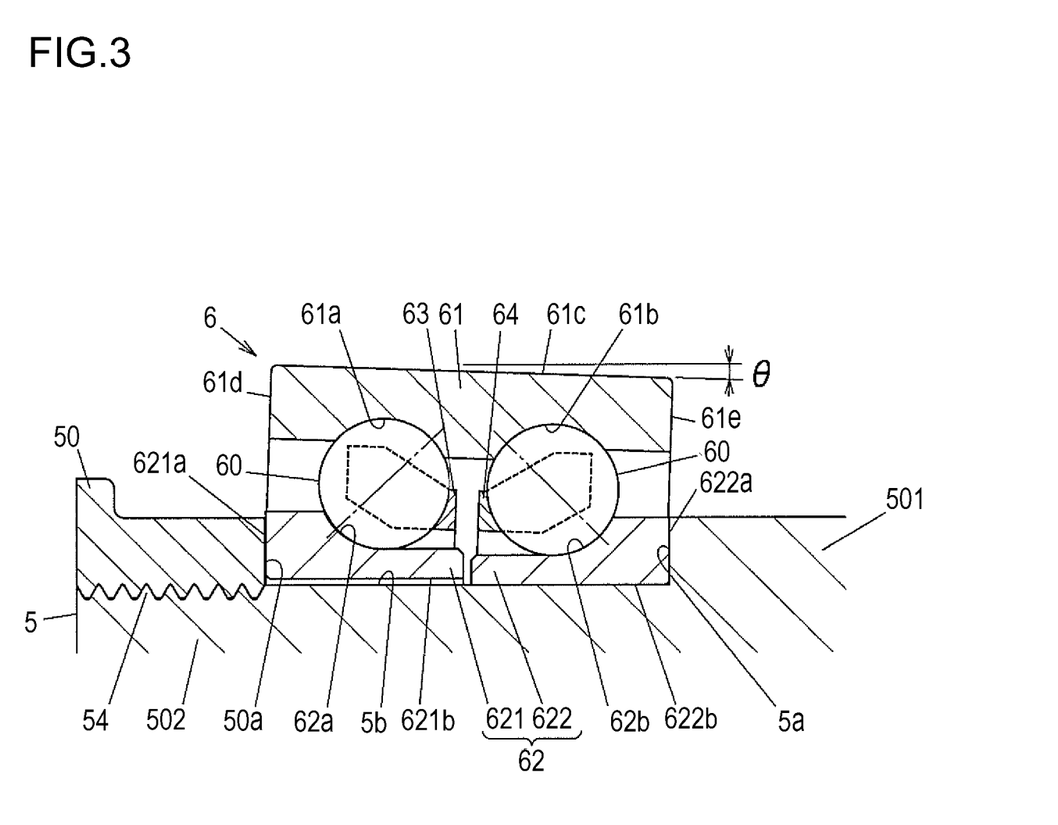
FIG. 3 is a sectional view illustrating a rolling bearing when a first inner ring member is fixed eccentrically from a ball nut member.

FIG. 3 is a sectional view illustrating the rolling bearing 6 when the first inner ring member 621 is fixed eccentrically from the ball nut member 5. For clarity of description, FIG. 3 exaggerates a clearance formed between the outer peripheral surface 5b of the ball nut member 5 and the inner peripheral surface 621b of the first inner ring member 621 out of the inner peripheral surface 621b of the first inner ring member 621 and the inner peripheral surface 622b of the second inner ring member 622. As illustrated in FIG. 3, the rolling elements 60 in the first row are brought into contact with the first outer ring raceway surface 61a and the first inner ring raceway surface 62a at a predetermined contact angle, and the rolling elements 60 in the second row are brought into contact with the second outer ring raceway surface 61b and the second inner ring raceway surface 62b at a predetermined contact angle. In FIG. 3, lines indicating the contact angles are represented by long dashed short dashed lines.

When the first inner ring member 621 is eccentric from the ball nut member 5, the outer peripheral surface 61c of the outer ring 61 is inclined with respect to the axial direction. In FIG. 3, the inclination angle of the outer peripheral surface 61c of the outer ring 61 is represented by θ. If the inclination angle θ is large, the ball nut member 5 is inclined with respect to the rack shaft 2 when the ball nut member 5 and the rolling bearing 6 are housed in the housing 3. As a result, a steering reactive force generated when the steering wheel 10 is steered increases or decreases periodically in response to a change in a steering angle.

Figure 4A:
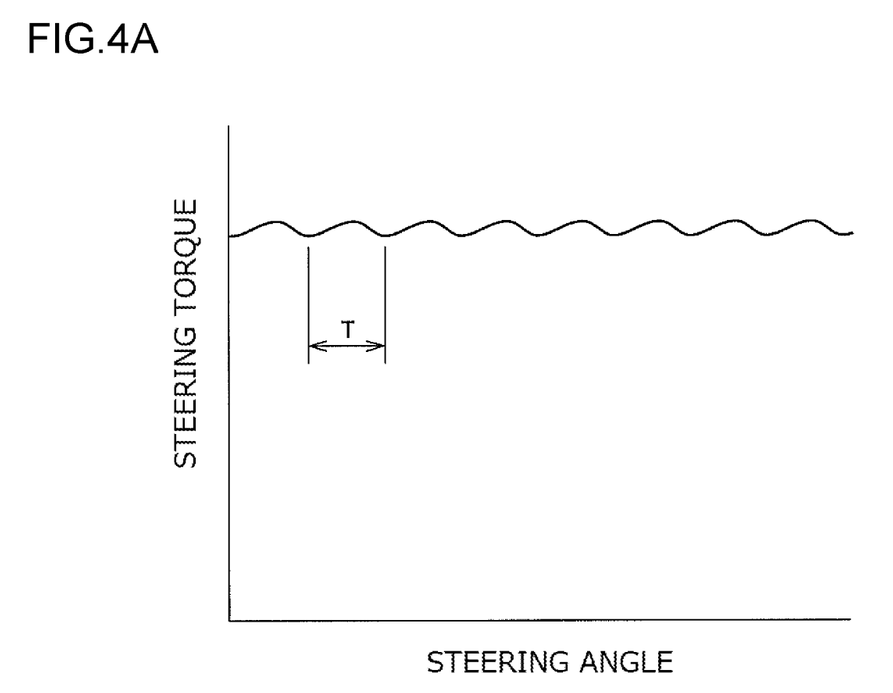
FIG. 4A is a graph illustrating a relationship between a steering angle and a steering torque when a steering wheel is steered, which is an example of a relationship between the steering angle and the steering torque when the outer peripheral surface of an outer ring is inclined but the inclination angle is small.
Figure 4B:
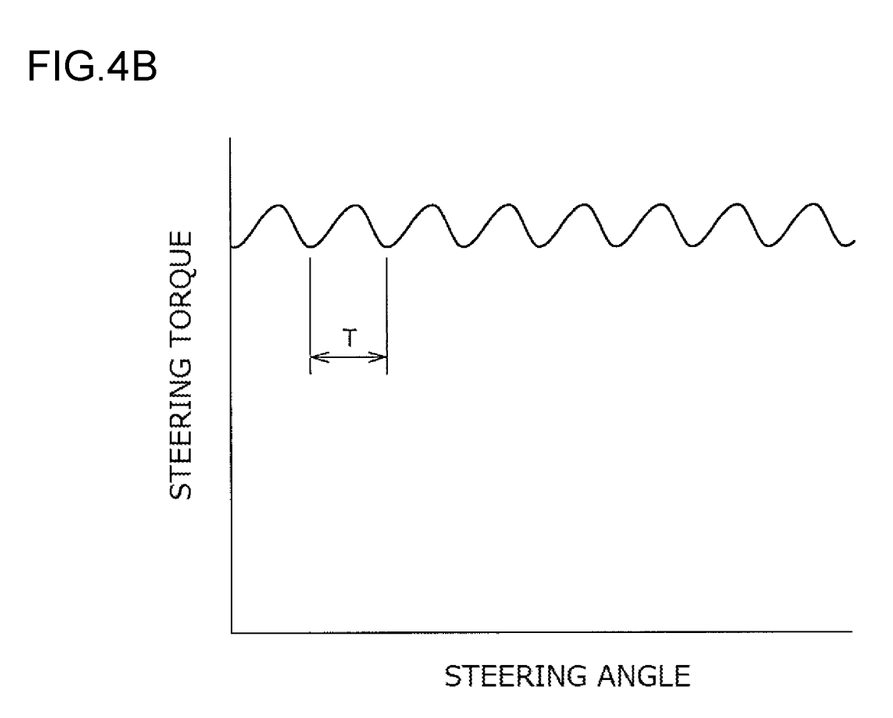
FIG. 4B is a graph illustrating a relationship between the steering angle and the steering torque when the steering wheel is steered, which is an example of a relationship between the steering angle and the steering torque when the inclination angle of the outer ring is large.

FIG. 4A and FIG. 4B are graphs illustrating relationships between the steering angle and the steering torque when the steering wheel 10 is steered. FIG. 4A illustrates an example of a relationship between the steering angle and the steering torque when the outer peripheral surface 61c of the outer ring 61 is inclined but the inclination angle θ is small. FIG. 4B illustrates an example of a relationship between the steering angle and the steering torque when the inclination angle θ of the outer ring 61 is large.

As illustrated in FIG. 4A and FIG. 4B, the steering torque (steering reactive force) increases or decreases periodically when the outer ring 61 is attached while being inclined with respect to the ball nut member 5. In this case, a period T is, for example, 75° based on the steering angle though the period T depends on a steering gear ratio. When the inclination angle θ increases, the steering torque increases because the rolling resistance of the balls 43 in the ball rolling path 400 increases at a specific rotational position of the ball nut member 5 relative to the housing 3. Such a change in the steering torque impairs the steering feel. Therefore, when the rolling bearing 6 is attached to the ball nut member 5 in a state in which the outer ring 61 is inclined significantly, it is necessary to perform reworking such as reattachment of the rolling bearing 6. Next, a method for inspecting the ball screw mechanism 40, that is, a method for inspecting the steering system 1 is described.

Figure 5:
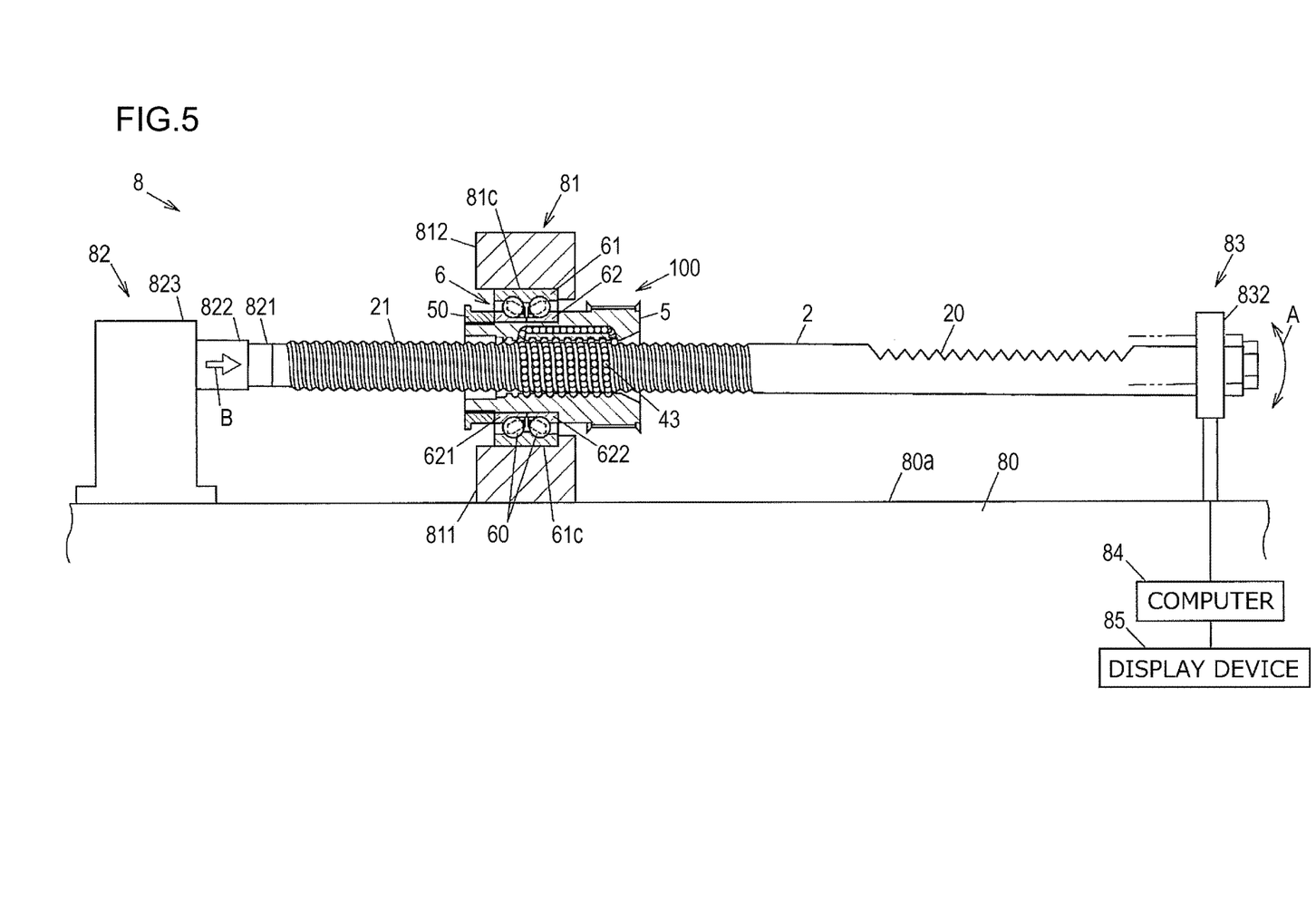
FIG. 5 is an explanatory drawing illustrating an inspection method according to an embodiment of the present invention.

FIG. 5 is an explanatory drawing illustrating the inspection method according to this embodiment. An inspection apparatus 8 for performing the inspection includes a fixing jig 81, a pusher 82, a displacement meter 83, a computer 84, and a display device 85. The fixing jig 81 fixes the outer ring 61 in a non-rotatable and axially immovable manner. The pusher 82 serves as a pressing device configured to press the rack shaft 2 in the axial direction while restricting its rotation to rotate the ball nut member 5 together with the inner ring 62 relative to the outer ring 61. The displacement meter 83 serves as a measurement device configured to measure an amount of a run-out of the rack shaft 2 along with the rotation of the ball nut member 5. The computer 84 serves as a determination device configured to determine whether the amount of the run-out of the rack shaft 2 that is measured by the displacement meter 83 satisfies a predetermined condition. The display device 85 displays a determination result from the computer 84. The inspection is performed by the inspection apparatus 8 before an assembly 100 having the rolling bearing 6 attached to the ball nut member 5 through which the rack shaft 2 is inserted is mounted into the housing 3.

Figure 6:
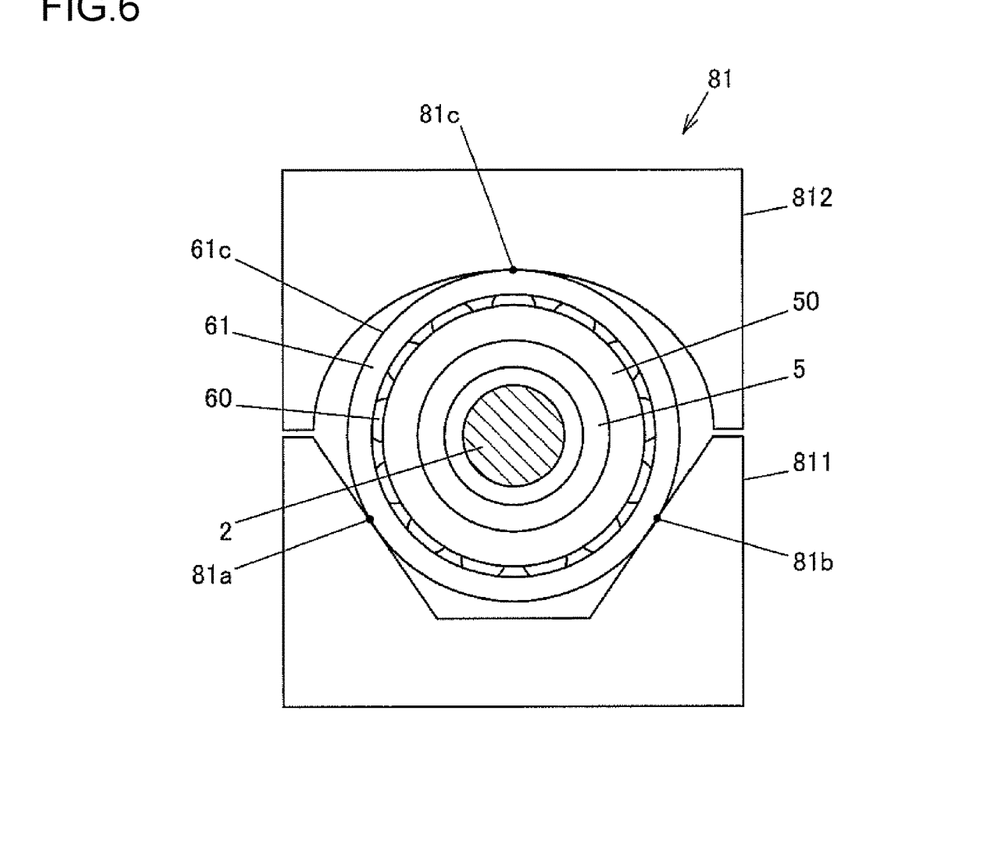
FIG. 6 is an explanatory drawing illustrating a state in which the rolling bearing having the outer ring fixed to a fixing jig is viewed from a pusher side together with the ball nut member and a rack shaft.

FIG. 6 is an explanatory drawing illustrating a state in which the rolling bearing 6 having the outer ring 61 fixed to the fixing jig 81 is viewed from the pusher 82 side together with the ball nut member 5 and the rack shaft 2. The fixing jig 81 includes a V block 811 and a holding member 812. The holding member 812 clamps the outer ring 61 between the V block 811 and the holding member 812. The holding member 812 is pressed toward the V block 811 by a pressing mechanism (not illustrated), thereby holding the outer ring 61 between the V block 811 and the holding member 812. The outer peripheral surface 61c of the outer ring 61 is brought into contact with the V block 811 at two contact portions 81a and 81b, and with the holding member 812 at one contact portion 81c. Thus, the outer ring 61 is stably fixed by being brought into contact with the fixing jig 81 at the three portions.

The V block 811 of the fixing jig 81, the pusher 82, and the displacement meter 83 are fixed to an upper face 80a of a base 80. The upper face 80a of the base 80 is horizontal, and an up-down direction of FIG. 5 corresponds to a vertical direction. The contact portions 81a, 81b, and 81c on the fixing jig 81 with the outer ring 61 linearly extend in the horizontal direction, and the outer ring 61 is fixed to the fixing jig 81 so that a central axis of the outer ring 61 is horizontal. Therefore, when the outer ring 61 is, for example, fixed while being inclined with respect to the ball nut member 5 as illustrated in FIG. 3, the rack shaft 2 is inclined with respect to the outer ring 61 at an angle corresponding to the inclination angle θ. Thus, the rack shaft 2 has a run-out in the up-down direction (arrow A direction illustrated in FIG. 5) along with the rotation of the ball nut member 5.

Figure 7:
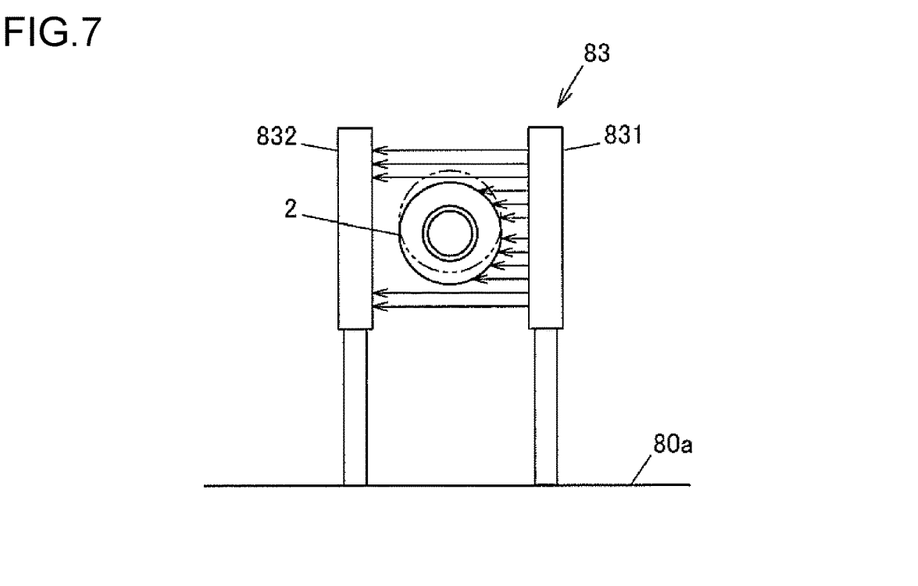
FIG. 7 is an explanatory drawing illustrating a displacement meter that is viewed in an axial direction of the rack shaft.

FIG. 7 is an explanatory drawing illustrating the displacement meter 83 that is viewed in the axial direction of the rack shaft 2. Specifically, the displacement meter 83 is a laser displacement meter including a light emitting unit 831 configured to emit laser beams, and a light receiving unit 832 configured to receive the laser beams emitted from the light emitting unit 831. The light emitting unit 831 radiates the laser beams in the horizontal direction from a plurality of light emitting elements that are linearly arranged along the vertical direction. The rack shaft 2 is arranged between the light emitting unit 831 and the light receiving unit 832, and laser beams blocked by the rack shaft 2 do not reach the light receiving unit 832. Therefore, when the rack shaft 2 has the run-out in the up-down direction, the positions of the laser beams blocked by the rack shaft 2 change. Thus, the amount of the run-out of the rack shaft 2 is measured by the displacement meter 83. A measurement result from the displacement meter 83 is input to the computer 84.

In this embodiment, the displacement meter 83 measures an amount of displacement (amount of run-out) in the up-down direction at a cylindrical portion of the rack shaft 2 that is located farther away from the ball track 21 than the portion where the rack teeth 20 are formed. In FIG. 5 and FIG. 7, the continuous lines indicate a state in which the end of the rack shaft 2 whose run-out amount is measured by the displacement meter 83 is located on the lowermost side, and the long dashed double-short dashed lines indicate a state in which the end is located on the uppermost side. For clarity of description, FIG. 5 and FIG. 7 exaggerate the amount of the run-out of the rack shaft 2.

The pusher 82 includes an elastic member 821, a rod 822, and a body 823. The elastic member 821 abuts against one end of the rack shaft 2. The rod 822 presses the rack shaft 2 via the elastic member 821. The body 823 advances or retreats the rod 822. For example, the elastic member 821 is formed of synthetic rubber. For example, the body 823 pushes the rod 822 in the horizontal direction toward the rack shaft 2 by a hydraulic pressure, a pneumatic pressure, or an electromagnetic force. In FIG. 5, a direction in which the rod 822 is pushed is indicated by an arrow B.

Figure 8:
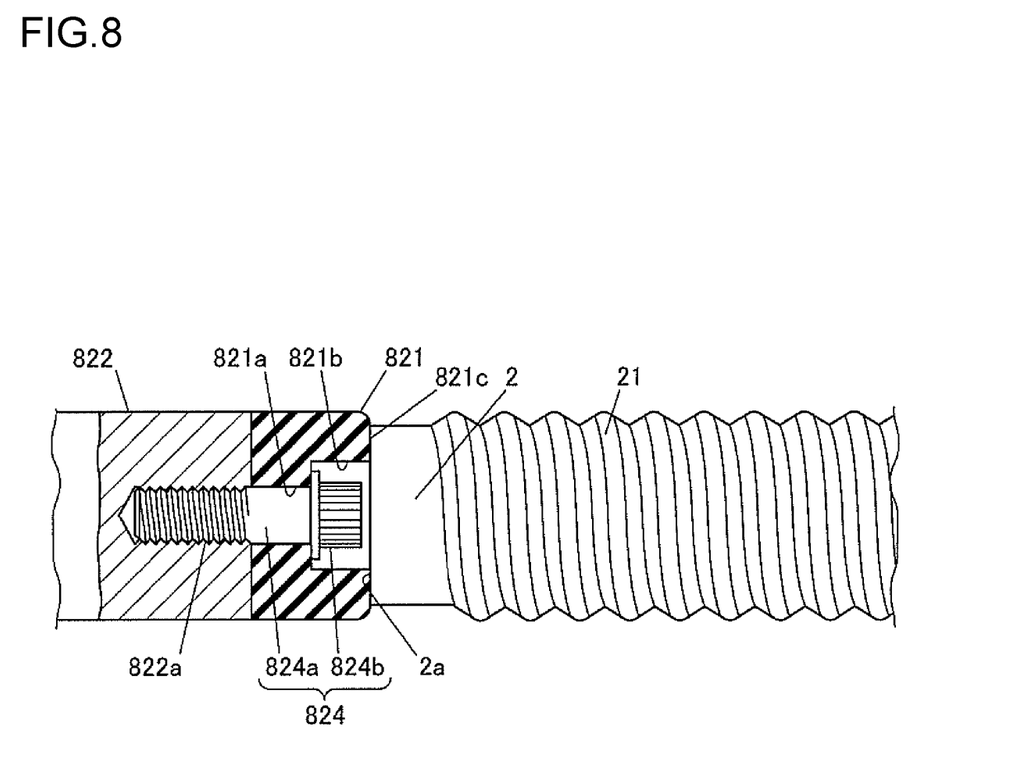
FIG. 8 is a local sectional view illustrating the structure of an elastic member that abuts against one end of the rack shaft and the periphery of the elastic member.

FIG. 8 is a local sectional view illustrating the structure of the elastic member 821 that abuts against the one end of the rack shaft 2 and the periphery of the elastic member 821. The elastic member 821 is fixed to the rod 822 with a bolt 824. The elastic member 821 has a bolt insertion hole 821a and a recess 821b. A shank 824a of the bolt 824 is inserted through the bolt insertion hole 821a. The recess 821b communicates with the bolt insertion hole 821a, and houses a head 824b of the bolt 824. An axial end face 821c of the elastic member 821, which is an open end face of the recess 821b, is brought into contact with an end face 2a of the rack shaft 2. The rod 822 has a threaded hole 822a with which the shank 824a of the bolt 824 threadedly engages.

In the inspection apparatus 8, the run-out of the rack shaft 2 is permitted by elastic deformation of the elastic member 821. The rotation of the rack shaft 2 is restricted by a frictional force generated between the elastic member 821 and the one end of the rack shaft 2, more specifically, a frictional force generated between the axial end face 821c of the elastic member 821 and the end face 2a of the rack shaft 2. Thus, when the pusher 82 presses the rack shaft 2 in the axial direction while restricting its rotation, the pusher 82 causes the elastic member 821 to abut against the one end of the rack shaft 2, and presses the rack shaft 2 in the axial direction via the elastic member 821.

The inspection of the ball screw mechanism 40 is performed such that the outer ring 61 is fixed to the fixing jig 81, the pusher 82 presses the rack shaft 2 in the axial direction while restricting its rotation to rotate the ball nut member 5 together with the inner ring 62 relative to the outer ring 61, the displacement meter 83 measures the amount of the run-out of the rack shaft 2 along with the rotation of the ball nut member 5, and the computer 84 determines whether the amount of the run-out of the rack shaft 2 satisfies the predetermined condition. The predetermined condition is a normality determination condition for determining that an inspection result is acceptable. Specifically, the predetermined condition is such a condition that the amount of the run-out of the rack shaft 2 that is measured by the displacement meter 83 is equal to or lower than a permissible upper limit value (for example, ±0.5 mm). A determination result from the computer 84 is presented to an operator by being displayed on the display device 85. When the determination result indicates "acceptable", the operator assembles the steering system 1 by mounting the assembly 100 subjected to the inspection into the housing 3.

When the determination result indicates "unacceptable", the operator detaches the assembly 100 that is a rejected product from the inspection apparatus 8, temporarily loosens the ring nut 50, and then retightens the ring nut 50 onto the external thread 54 of the ball nut member 5. Then, the inspection described above is performed for the reworked assembly 100 again.

That is, a method for manufacturing the ball screw mechanism 40 includes an inspection step of measuring the amount of the run-out of the rack shaft 2 when the pusher 82 presses the rack shaft 2 in the axial direction while restricting its rotation in the state in which the outer ring 61 is fixed to the fixing jig 81, and determining whether the amount of the run-out satisfies the predetermined condition.

According to the inspection method and the manufacturing method described above, failure in attachment of the rolling bearing 6 can be detected before the assembly 100 is mounted into the housing 3. Therefore, the reworking can be performed more easily than, for example, a case where the failure in attachment is detected based on a range of increase or decrease in the steering torque after the assembly 100 is mounted into the housing 3. When the predetermined condition is not satisfied in the inspection step, a reworking step of loosening the ring nut 50 and then retightening the ring nut 50 onto the external thread 54 may be added after the inspection step. The addition of the reworking step improves yield of products.

Figure 9:
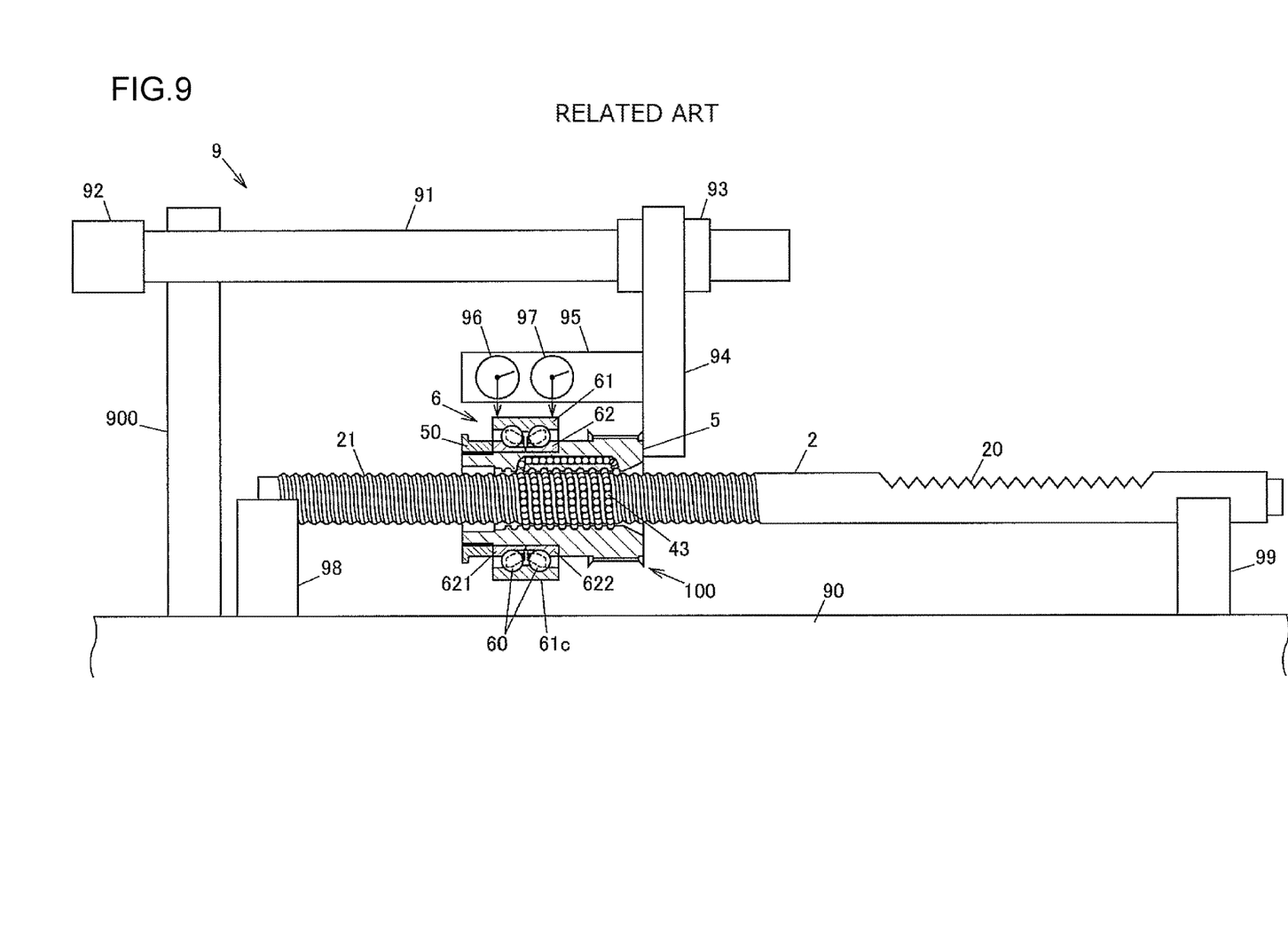
FIG. 9 is an explanatory drawing illustrating an example of a related-art method and apparatus for inspecting a ball screw mechanism.

FIG. 9 is an explanatory drawing illustrating an example of a related-art method and apparatus for inspecting the ball screw mechanism 40 (related art). An inspection apparatus 9 includes a linear guide 91, a motor 92, a linear block 93, a pressing plate 94, a gauge panel 95, a pair of displacement meters 96 and 97, and a pair of support members 98 and 99. The linear guide 91 is fixed to a support column 900 so as to extend in the horizontal direction. The support column 900 is provided upright on a base 90. The motor 92 is arranged at one end of the linear guide 91. The linear block 93 is driven by the motor 92 to linearly move along a longitudinal direction of the linear guide 91. The pressing plate 94 is fixed to the linear block 93. The gauge panel 95 is attached to the pressing plate 94. The displacement meters 96 and 97 are arranged on the gauge panel 95. The support members 98 and 99 support the rack shaft 2 in an axially immovable and non-rotatable manner relative to the base 90.

The distal end of the pressing plate 94 abuts against one axial end of the ball nut member 5 of the assembly 100 subjected to the inspection, and the pressing plate 94 presses the ball nut member 5 in the axial direction along with movement of the linear block 93 toward the support column 900. Thus, the ball nut member 5 moves in the axial direction while rotating together with the rolling bearing 6.

The displacement meters 96 and 97 can measure the amounts of displacement in the radial direction at both axial ends of the outer peripheral surface 61c of the outer ring 61. For example, when the outer ring 61 is attached without being inclined with respect to the ball nut member 5, the detection values of the displacement meters 96 and 97 do not change even when the ball nut member 5 rotates. When the outer ring 61 is attached while being inclined with respect to the ball nut member 5, the detection values of the displacement meters 96 and 97 change along with the rotation of the ball nut member 5. Thus, it can be determined whether the outer ring 61 is inclined with respect to the ball nut member 5 based on the amounts of change in the detection values of the displacement meters 96 and 97. As the displacement meters 96 and 97, there may be used a contact type displacement meter in which a probe is brought into contact with the outer peripheral surface 61c of the outer ring 61, or an optical displacement meter using, for example, reflection of a laser beam.

In this inspection method, however, a slight inclination of the outer ring 61 with respect to the ball nut member 5 cannot be detected unless the detection accuracies of the displacement meters 96 and 97 are considerably high. Specifically, the displacement meters 96 and 97 are required to have micron-order detection accuracies. Therefore, erroneous detection may occur, for example, when the outer ring 61 vibrates through the rotation of the ball nut member 5.

In the inspection method using the inspection apparatus 8 according to this embodiment, even a slight inclination of the outer ring 61 with respect to the ball nut member 5 is amplified and appears at the detection portion of the displacement meter 83 for the rack shaft 2. This amplification effect is based on a difference between the axial width of the outer ring 61 and the length of the rack shaft 2 between the ball nut member 5 and the displacement meter 83. In this embodiment, the inclination of the outer ring 61 is detected by the displacement meter 83 while being amplified by a factor of, for example, 20 to 30 as compared to the axial end of the outer peripheral surface 61c.

Therefore, even if the detection accuracy of the displacement meter 83 is relatively low, the slight inclination of the outer ring 61 with respect to the ball nut member 5 can be detected, thereby suppressing the occurrence of erroneous detection. Further, the inclination of the outer ring 61 can be detected by the single displacement meter 83, and the detection accuracy may be low. Therefore, the cost of the inspection apparatus 8 can be reduced.

As described above, according to this embodiment, the ball nut member 5 is rotated in the state in which the outer ring 61 is fixed, and the amount of the run-out of the rack shaft 2 along with the rotation of the ball nut member 5 is measured. Therefore, when the attachment accuracy of the rolling bearing 6 is low and the outer ring 61 is attached while being inclined with respect to the ball nut member 5, the failure in attachment can be detected with high accuracy. Thus, the failure in attachment of the outer ring 61 can be detected before the assembly 100 having the rolling bearing 6 attached to the ball nut member 5 is mounted into the housing 3. Accordingly, the reworking operation can be performed easily. Even if the assembly 100 whose determination result indicates "unacceptable" is discarded, waste can be reduced as compared to a case where the assembly 100 is discarded together with the housing 3 and the steering shaft 11 after the assembly 100 is mounted into the housing 3.

According to this embodiment, the pusher 82 presses the rack shaft 2 in the axial direction via the elastic member 821 that abuts against the one end of the rack shaft 2. Therefore, the run-out of the rack shaft 2 is permitted by the elastic deformation of the elastic member 821, and the rotation of the rack shaft 2 is restricted by the frictional force generated between the elastic member 821 and the rack shaft 2. Thus, the inspection apparatus 8 can be constructed simply.

The present invention may be modified as appropriate without departing from the spirit of the present invention. For example, the ball screw mechanism inspected by the inspection method or the inspection apparatus according to the present invention may be used in various devices or apparatuses such as a machine tool.

What is claimed is:

1. A method for inspecting a ball screw mechanism including:
    a shaft having a helical ball track formed on its outer peripheral surface;
    a cylindrical ball nut member that threadedly engages with the ball track via a plurality of balls;
    a housing that houses the ball nut member; and
    a rolling bearing including an outer ring retained by the housing, an inner ring retained by the ball nut member, and a plurality of rolling elements arranged between the outer ring and the inner ring,
    the ball screw mechanism being configured to move the shaft in an axial direction relative to the housing through rotation of the ball nut member,
    the method comprising:
    fixing the outer ring to a jig, and pressing the shaft in the axial direction while restricting its rotation to rotate the ball nut member together with the inner ring relative to the outer ring;
    measuring an amount of a run-out of the shaft along with the rotation of the ball nut member; and
    determining whether the amount of the run-out satisfies a predetermined condition.

2. The method for inspecting a ball screw mechanism according to claim 1, wherein the pressing the shaft in the axial direction while restricting its rotation includes causing an elastic member to abut against one end of the shaft, and pressing the shaft in the axial direction via the elastic member.

3. An apparatus for inspecting a ball screw mechanism including:
    a shaft having a helical ball track formed on its outer peripheral surface;
    a cylindrical ball nut member that threadedly engages with the ball track via a plurality of balls;
    a housing that houses the ball nut member; and
    a rolling bearing including an outer ring retained by the housing, an inner ring retained by the ball nut member, and a plurality of rolling elements arranged between the outer ring and the inner ring,
    the ball screw mechanism being configured to move the shaft in an axial direction relative to the housing through rotation of the ball nut member,
    the apparatus comprising:
    a jig configured to fix the outer ring in a non-rotatable and axially immovable manner;
    a pressing device configured to press the shaft in the axial direction while restricting its rotation to rotate the ball nut member together with the inner ring relative to the outer ring;
    a measurement device configured to measure an amount of a run-out of the shaft along with the rotation of the ball nut member; and
    a determination device configured to determine whether the amount of the run-out measured by the measurement device satisfies a predetermined condition.

4. The apparatus for inspecting a ball screw mechanism according to claim 3, wherein
    the pressing device includes:
    an elastic member configured to abut against one end of the shaft;

a rod configured to press the shaft via the elastic member; and a body configured to advance or retreat the rod, and the run-out of the shaft is permitted by elastic deformation of the elastic member, and the rotation of the shaft is restricted by a frictional force generated between the elastic member and the one end of the shaft.

5. A method for inspecting a steering system including:

a rack shaft configured to move in an axial direction through rotation of a steering shaft to which a steering wheel of a vehicle is coupled;

a steering assist apparatus configured to apply a steering assist force for assisting a steering operation for the steering wheel to the rack shaft; and a housing that houses the rack shaft together with the steering assist apparatus, the steering assist apparatus including:

a cylindrical ball nut member that threadedly engages, via a plurality of balls, with a helical ball track formed on an outer peripheral surface of the rack shaft;

an electric motor configured to rotate the ball nut member relative to the rack shaft; and a rolling bearing including an outer ring retained by the housing, an inner ring retained by the ball nut member, and a plurality of rolling elements arranged between the outer ring and the inner ring, the steering system being configured to turn a steered wheel through movement of the rack shaft in a vehicle width direction, the method comprising:

fixing the outer ring to a jig, and pressing the rack shaft in the axial direction while restricting its rotation to rotate the ball nut member together with the inner ring relative to the outer ring;

measuring an amount of a run-out of the rack shaft along with the rotation of the ball nut member; and determining whether the amount of the run-out satisfies a predetermined condition.

\* \* \* \* \*